Patented Oct. 24, 1950

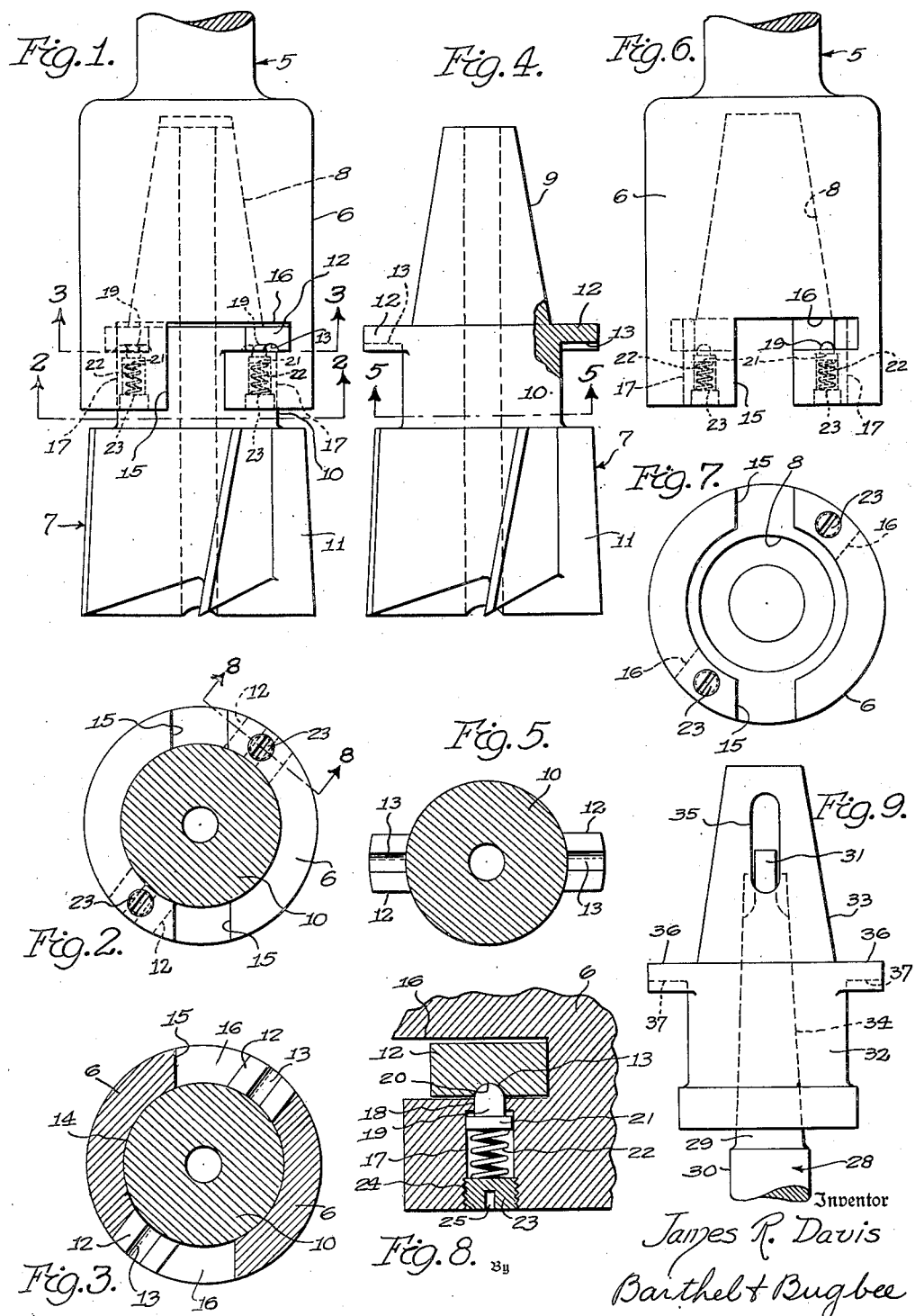

2,526,998

UNITED STATES PATENT OFFICE 2,526,998

SELF-CENTERING DETACHABLE COUPLING FOR MACHINE TOOLS

James R. Davis, Detroit, Mich.

Application January 8, 1945, Serial No. 571,757

2 Claims. (Cl. 279—93)

The present invention relates to improvements in quick detachable tool holders and chucking devices for retaining machine tools such as drills, reamers and the like in coupled relation with a machine spindle.

The primary object of the invention is to provide a tool holder and coupling device to facilitate the quick interchanging of machine tools such as drills, reamers and punches, whereby machine tools can be easily and quicky coupled and uncoupled with respect to a driving spindle.

Another object of the invention is to provide a tool holder and tool therefor so constructed as to permit the easy insertion and removal of the tool from the tool holder without necessitating the use of detent screws or other fastening and holding devices.

Another object of the invention is to provide a tool such as a drill, reamer or end mill and a holder therefor having fast taper surfaces adapted to be mutually engaged to prevent removal of the tool from said holder while the tool is in operation.

Another object of the invention is to provide a tool and holder therefor having driving coupling means therebetween to insure rotational movement of the tool upon rotation of the tool holder.

Another object of the invention is to provide a machine tool such as a drill, reamer, end mill or punch and the like with a tapered shank portion for being received in a tapered bore in the tool holder so that the mutual tapered surfaces will be frictionally held in engagement by yielding spring means carried by the tool holder.

Another object of the invention is to provide a machine tool such as a drill or the like with a tapered shank portion for being received in the tapered bore of a tool holder for frictionally coupling the tool and holder and to provide detent means on the machine tool shank adapted to enter a bayonet slot in the wall of the tool holder and thereby provide a driving connection between the tool and tool holder.

Another object of the invention is to provide a tool holder and machine tool coupling of the above-mentioned type in which the yielding spring means for urging the mutually engaging tapered surfaces into frictional contact also locks the detents carried by the shank of the machine tool against rotational movement and displacement.

Another object of the invention is to provide a machine tool and holding chuck therefor in which the yielding spring means for urging the frictional surfaces of the tool and holding chuck together and preventing rotational displacement of the lug projections on the machine tool may be adjusted so as to place the lug projections under various degrees of tension and regulate the frictional gripping action between the mutually tapered frictional surfaces.

Other objects and advantages of the invention will become apparent during the course of the following description of the accompanying drawing, wherein:

Figure 1 is a side elevational view of the tool holder and machine tool embodying the present invention, showing the same in coupled relation with the mutual friction gripping surfaces in engagement and the locking lugs carried by the tool received in the bayonet slots in the tool holder;

Figure 2 is a horizontal cross-sectional view taken on line 2—2 of Figure 1 looking in the direction of the arrows and illustrating the relative positions of the locking detent lugs with respect to the spring loaded retaining plungers when the machine tool and holding chuck are arranged in coupled relation;

Figure 3 is a horizontal cross-sectional view taken on line 3—3 of Figure 1 looking in the direction of the arrows and illustrating the manner in which the locking lugs are received in the bayonet slots when the tool is in coupled relation with the tool holding chucking device;

Figure 4 is a side elevational view of the machine tool showing a portion thereof broken away to illustrate the manner in which the detent lug projections are recessed or indented for receiving the ends of the retaining spring-loaded plungers;

Figure 5 is a horizontal cross-sectional view taken on line 5—5 of Figure 4 looking in the direction of the arrows to illustrate the manner in which the detent lug projections are arranged in diametrically opposed relation;

Figure 6 is a side elevational view of the tool holder showing the arrangement of the L-shaped slots therein for receiving the lug projections on the machine tool shank;

Figure 7 is a bottom plan view of the tool holder further showing the relative positions of the L-shaped bayonet slots and the adjusting screws for varying the tension on the spring-loaded plungers;

Figure 8 is an enlarged cross-sectional view taken on the oblique line 8—8 of Figure 2 looking in the direction of the arrows and illustrating in detail the manner in which the lug projections on the tool shank are engaged by the spring-loaded plungers; and Figure 9 is a side elevational view of a modified form of the invention showing the invention as applied to an extension shank and adapter.

In the drawings, attention is directed to Figures 1 to 8 inclusive wherein there is shown a preferred embodiment of the invention in the form of a quickly detachable coupling between a driving machine tool spindle and a machine tool such as a reamer or the like. Generally, the reference character 5 will be employed to represent the spindle of a machine tool having the usual feed mechanism (not shown) for moving the spindle downwardly and upwardly when the machine tool is in operation.

Formed integral with the feed spindle 5 is an enlarged head 6 which is adapted to provide a tool holder for driving a tool generally indicated by the reference character 7 in the form of a reamer, but it is understood that the tool 7 may be of other types such as drills, punches and end mills and that the invention may be applied to tools of this type as well as to the reamer as shown in the drawing.

The tool holder 6 is provided with a tapered bore 8 extending centrally and longitudinally thereof and said bore is adapted to receive the tapered shank portion 9 of the tool 7 in such a manner that the mutually tapered surfaces will be in frictional engagement to retain the tool 7 within the holder 6 and permit quick interchanging of various tools within the holder. It is noted that the mutually engaging tapered surfaces 8 and 9 are of such a taper per inch (preferably 0.3750 inch per inch) to thereby provide a so-called fast taper and one which will permit the tool 7 to be removed easily by simply jarring the tool holder 6 by tapping the same but yet to provide sufficient frictional contact between the mutually engaging tapered frictional surfaces when pressure is applied to the machine spindle 5 during rotation thereof and the cutting operation of the tool so as to provide a frictional gripping action between the tapered bore 8 and shank portion 9.

The reamer or other tool 7 is provided with an intermediate shank portion 10 and a series of cutting blades 11 at one end thereof (Figure 4) and the intermediate shank portion 10 is formed with a pair of diametrically opposed lug projections 12 having recesses or indentations 13 cut on the under side thereof and extending radially from the center of the tool 7. The radially extending lug projections 12 are formed at the base portion of the tapered shank 9 and are adapted to provide driving detent members for the tool 7.

The tool holder 6 is provided with an enlarged bore portion 14 coaxial with the tapered bore 8 and the wall of the tool holder 6 is provided at diametrically opposite points with L-shaped slots having axially extending portions 15 and circumferentially extending portions 16. The circumferentially extending portions 16 are of a slightly greater width than the thickness of the lug projections 12 so as to permit a slight play therebetween for a purpose to be hereinafter more fully described. It will thus be seen that the tool 7 may be inserted in the tool holder 6 and centered therein by the mutually engaging frictional tapered surfaces 8 and 9 and the lug projections 12 passed through the axially extending portion 15 of the L-slot and then shifted by a partial rotation of the tool 7 so as to enter the circumferentially extending portion 16 of the L-slot. With the tool in this position, rotation of the drill or feed spindle 5 will cause rotation of the tool holder 6 and the tool 7 so that when the tool spindle 5 is fed downwardly into engagement with the work, the pressure exerted on the tool spindle will cause the mutually engaging frictional tapered surfaces 8 and 9 to frictionally grip and provide a friction gripping action while the radially extending lug projections 12 will provide a positive driving action.

Formed on diametrically opposed sides of the tool holder 6 is a pair of axially extending bores 17 having a reduced bore 18 extending into the circumferentially extending slots 16 (Figure 8) for receiving a plunger pin 19 having a rounded tip portion 20 and a head portion 21 slidably received in the bore 17. The plunger 19 extends through the bore 18 and the head portion 21 is adapted to be engaged by a coil spring 22 located within the bore 17 and held therein by a screw plug 23 which is threaded in suitable threads 24 in the lower portion of the bore 17. The screw plug 23 is provided with a kerf 25 for receiving a tool or instrument to facilitate tightening or loosening of the screw-threaded plug 23 and thereby regulate the tension of the coil spring 22 when pressure is exerted on the plunger 19.

When the tool 7 is in position within the holder 6 as shown in Figure 1, the mutually engaging frictional tapered surfaces 8 and 9 will be held in engagement by the axial pressure exerted by the plungers 19 on the radially extending lug projections 12 and in addition, the spring-loaded plungers 19 will be received in the radially extending indentations or grooves 13 on the underside of said radially extending lug projections so as to provide a positive drive between the radially extending lug projections on the tool holder 6.

In operation, the tool 7 may be coupled to the tool holder 6 by inserting the tapered shank portion 9 in the tapered bore 8 with the radially extending lug projections 12 arranged to enter the longitudinally extending portions 15 of the L-slot so that a partial rotation of the tool 7 will cause said radially extending lug projections 12 to pass into the circumferentially extending portions 16 of the L-slot until the tip 20 of the plunger 19 is received in the recesses or indentations 13 therein. When the tool has thus been positioned relative to the tool holder 6, the spring-loaded plunger 19 will exert an axial force on the tapered shank 9 and thereby create a frictional gripping action between the mutually engaging frictional surfaces 8 and 9 of the tool holder and tool, respectively. When the tool is in place in the tool holder 6, the rotary machine spindle 5 may be lowered so as to bring the cutting edges of the tool 7 such as the blade 11 into engagement with the work so that the pressure applied in a downward direction will cause a greater frictional action between the mutually engaging frictional surfaces 8 and 9 and thereby lock the tool and tool holder in coupled relation. In addition, the radially extending lug projections 12 are received in the L-slots in abutting relation with the end wall of the circumferentially extending portion thereof and said lug projections have their slots or indentations 13 in registry with plungers 19 so as to provide a positive driving action between the tool holder 6 and tool 7.

In the modified form of the invention shown in Figure 9, an adapter is illustrated for converting a tool such as a drill or the like 28 with a tapered shank portion 29 of the Morse type for quick coupling and uncoupling as was pointed out in connection with the form of the invention illustrated in Figures 1 to 8, inclusive. Generally, tools such as drills and the like, indicated by the reference character 28 include a parallel shank portion 30 fashioned on the lower end to provide metal removing cutters such as drills, reamers and end mills and the upper portion is provided with a so-called Morse type tapered shank 29 having a tang 31 for being received in an opening in the upper end of the tapered bore of the drill spindle. The tool 28 is thus frictionally held in place and when pressure is applied to the tool 28, the tapered surfaces provide a gripping action and the tank 31 provides a positive drive. Extreme difficulty is experienced in removing drills having so-called Morse type tapers from the drill spindle chuck by reason of the great wedging action between the mutually engaging frictional surfaces of the shank and tapered bore in the tool spindle chuck.

The adapter shown in Figure 9 is intended to permit tools having Morse tapered shanks 29 to be inserted in the tool holder 6 of the form of the invention shown in Figures 1 to 8, inclusive, and said adapter includes a body portion 32 on the upper end of which is formed a tapered shank 33 having a taper per inch corresponding to the taper of the shank 9 shown in the form of the invention in Figures 1 to 8, inclusive. The adapter is provided with a tapered bore 34 extending longitudinally and centrally thereof for receiving the Morse type tapered shank 29 and said bore 34 terminates at its upper end in a transversely extending passageway or slot 35 to facilitate the insertion of a tool or the like to engage the tang 31 and remove the tool 28. Formed on the body portion 32 of the adapter is a pair of diametrically opposed projection lugs 36 similar to the radially projecting lugs 12 formed on the body portion of the shank 10 in the form of the invention shown in Figures 1 to 8, inclusive, and said lugs 36 are provided with radially extending slots or indentations 37 on the underside thereof. The tool 28 is adapted to be inserted in the adapter 32 and the adapter is adapted to be inserted in the tool holder 6 shown in Figures 1 to 8, inclusive, by passing the tapered portion 33 into the tapered bore 8 thereof so that the radially extending lug projections 36 will enter the axially extending portions 15 of the L-slots in said tool holder. By then partially rotating the adapter 32 so that the radially extending lug projections 36 will pass into the circumferentially extending portions 16 of the L-slots with the plungers 19 carried by the tool holder received in the indentations or slots 37 in the radially extending lug projections 36, the adapter will be fastened in place in substially the same fashion as pointed out and described in connection with the tool 7 in the form of the invention shown in Figures 1 to 8, inclusive.

When the radially extending luges 36 are received in the circumferentially extending portions of the slots 16, the spring-loaded plungers 19 will engage said projections and yieldingly urge the tapered shank portion 33 into frictional engagement with the tapered bore 8 in the tool holder 6. Thus it will be seen that the adapter 32 may be quickly and easily inserted and removed with respect to the tool holder 6 as pointed out in connection with the tool 7 in Figures 1 to 8, inclusive.

The spring tension on the plungers 19 may be varied by adjusting the screw plugs 23 to insure sufficient yielding pressure between the mutually engaging frictional tapered surfaces of the tool and tool holder as well as the adapter and tool holder.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A quickly detachable tool coupling device for machine tools, comprising a rotary tool holder attachable to a machine tool and having a head with a tapered socket therein and approximately L-shaped slots extending inward from the end of said head through the opposite side walls thereof, a tool having a tapered shank fitting said tapered socket and having laterally projecting arms shaped to enter said L-shaped slots axially and slide circumferentially therein, said head having a plurality of axial bores on opposite sides thereof opening into said L-shaped slots, and springs and plungers mounted in said bores, said plungers engaging said arms on the opposite sides thereof from said tapered socket, and said springs engaging and urging said plungers toward said arms and thereby urging said tapered tool shank into said tapered tool holder socket.

2. A quickly detachable tool coupling device for machine tools, comprising a rotary tool holder attachable to a machine tool and having a head with a tapered socket therein and approximately L-shaped slots extending inward from the end of said head through the opposite side walls thereof, a tool having a tapered shank fitting said tapered socket and having laterally projecting arms shaped to enter said L-shaped slots axially and slide circumferentially therein, said head having a plurality of axial bores on opposite sides thereof opening into said L-shaped slots, and springs and plungers mounted in said bores, said plungers engaging said arms on the opposite sides thereof from said tapered socket, and said springs engaging and urging said plungers toward said arms and thereby urging said tapered tool shank into said tapered tool holder socket, said arms having radial grooves engaged by said plungers.

JAMES R. DAVIS.

REFERENCES CITED

The following references are of record in the file of this patent:

UNITED STATES PATENTS

| Number | Name | Date |
|---|---|---|
| 931,327 | Manzel | Aug. 17, 1909 |

FOREIGN PATENTS

| Number | Country | Date |
|---|---|---|
| 19,503 | Great Britain | Sept. 1, 1911 |